US011360505B2

(12) United States Patent
Dickie et al.

(10) Patent No.: US 11,360,505 B2
(45) Date of Patent: Jun. 14, 2022

(54) DISTRIBUTED NETWORK TIME SYNCHRONIZATION

(71) Applicant: Simmonds Precision Products, Inc., Vergennes, VT (US)

(72) Inventors: David F. Dickie, Granby, CT (US); Travis DeMent, Burlington, VT (US); Thomas Henck, Huntington, VT (US); Daniel Hiatt, South Burlington, VT (US); Travis Gang, Hinesburg, VT (US); Benjamin T. Rule, Vergennes, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 73 days.

(21) Appl. No.: 16/788,135

(22) Filed: Feb. 11, 2020

(65) Prior Publication Data
US 2021/0247799 A1 Aug. 12, 2021

(51) Int. Cl.
*G06F 1/12* (2006.01)
(52) U.S. Cl.
CPC ...................................... *G06F 1/12* (2013.01)
(58) Field of Classification Search
CPC ..... G06F 1/32; G06F 1/26; G06F 1/12; G06F 1/28
See application file for complete search history.

(56) References Cited

U.S. PATENT DOCUMENTS

| 6,236,623 | B1 | 5/2001 | Read et al. | |
|---|---|---|---|---|
| 8,503,484 | B2 | 8/2013 | Bonk et al. | |
| 10,411,793 | B1 | 9/2019 | Ramsey et al. | |
| 10,511,403 | B2 | 12/2019 | Bush et al. | |
| 2013/0157593 | A1 | 6/2013 | Achanta | |
| 2014/0035636 | A1* | 2/2014 | Toda | H03K 5/135 327/153 |
| 2014/0362872 | A1* | 12/2014 | Grenabo | H04J 3/0667 370/507 |
| 2015/0131682 | A1* | 5/2015 | Gudipati | H04J 3/0673 370/503 |
| 2016/0011748 | A1* | 1/2016 | Zheng | G06F 3/1454 345/173 |
| 2019/0059066 | A1* | 2/2019 | Harmatos | H04J 3/0673 |
| 2019/0002456 | A1 | 8/2019 | Shah et al. | |

FOREIGN PATENT DOCUMENTS

EP 0991216 A2 4/2000

OTHER PUBLICATIONS

Extended European search report issued in corresponding EP Application No. 21156616.1 dated Jul. 12, 2021.
Jae Hun Cho et al:"A Novel Method for Providing Precise Time Synchronization in a Distributed Control System Using Boundary Clock",IEEE Transactions on Instrumentation and Measurement, IEEE Service Center, Piscataway, NJ, US,vol. 57, No. 8,Aug. 1, 2009 (Aug. 1, 2009), pp. 2824-2829, XP011256706, ISSN:0018-9456.

* cited by examiner

*Primary Examiner* — Keshab R Pandey
(74) *Attorney, Agent, or Firm* — Locke Lord LLP; Daniel J. Fiorello; Gabrielle Gelozin

(57) ABSTRACT

A distributed network system can include a master controller having a master clock configured to output a master time, and a master transmission delay time module configured to modify the master time to add a known master transmission delay to the master time to output an adjusted master time. The system can include a first device operatively connected to the master controller and configured to receive the adjusted master time from the master controller.

8 Claims, 2 Drawing Sheets

DISTRIBUTED NETWORK TIME SYNCHRONIZATION

FIELD

This disclosure relates to distributed networks, more specifically to distributed network time synchronization.

BACKGROUND

In a system of distributed data acquisition nodes, each node will have its own hardware clock. Each clock has slightly varying frequencies, causing time drift between each node as well as a sample rate error from node to node.

Such conventional methods and systems have generally been considered satisfactory for their intended purpose. However, there is still a need in the art for improved distributed network time synchronization. The present disclosure provides a solution for this need.

SUMMARY

A distributed network system can include a master controller having a master clock configured to output a master time, and a master transmission delay time module configured to modify the master time to add a known master transmission delay to the master time to output an adjusted master time. The system can include a first device operatively connected to the master controller and configured to receive the adjusted master time from the master controller.

The first device can include a first device receive delay time module configured to add a known first device receive delay to the adjusted master time to output a receive delay adjusted first device time, and a first device clock configured to receive the receive the delay adjusted first device time to be updated by the receive delay adjusted first device time to synchronize the first device clock with the master clock such that an updated first device clock time is equal or about equal to the master time. The first device can include a first device transmission delay module configured to receive the receive delay adjusted first device time and/or the updated first device clock time to add a known first device transmission delay to the receive delay adjusted first device time and/or the updated first device clock time to output a transmission delay adjusted first device time.

The system can include a second device operatively connected to the first device to receive the transmission delay adjusted first device time from the first device. The second device can include a second device receive delay time module configured to add a known second device receive delay to the transmission delay adjusted first device time to output a receive delay adjusted second device time, and a second device clock configured to receive the receive the delay adjusted second device time to be updated by the receive delay adjusted second device time to synchronize the second device clock with the master clock such that an updated second device clock time is equal or about equal to the master time.

In certain embodiments, the first device can be a subnetwork controller. In certain embodiments, the second device can be a sensor node that uses the second device clock for time stamping measurements. A plurality of the second device can be connected to the first device. In certain embodiments, one or more sensor nodes can be connected directly to the master controller.

In certain embodiments, the master controller, the first device, and/or the second device can include one or more FPGA's having a deterministic receive delay and/or transmission delay. Each connection between each of the master controller, the first device, and the second device can include a known connection delay which is included in at least one of a respective transmission delay and/or a respective receive delay. For example, in certain embodiments, each connection can be of a standard which has a deterministic connection delay as a function of the length of the wire. For example, the standard can be RS-485. Any other suitable deterministic hardware and/or software is contemplated herein.

In accordance with at least one aspect of this disclosure, a method can include synchronizing one or more node clocks of one or more data acquisition nodes in a distributed network to a master time of a master clock. Synchronizing can include modifying a master time from a master clock to add one or more transmission and/or receive delays to synchronize the one or more node clocks to the master. In certain embodiments, synchronizing can include first synchronizing a subnetwork controller clock to the master clock, and then synchronizing the one or more node clocks to the subnetwork controller clock.

Synchronizing can include adding all known transmission and receive delays between the master clock and the one or more node clocks to the master time to update the one or more node clocks. Adding all known transmission and receive delays can include adding deterministic FPGA processing delays. In certain embodiments, adding all known transmission and receive delays can include adding known connection delays as a function of length of the connections. The method can include any other suitable method(s) and/or portions thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
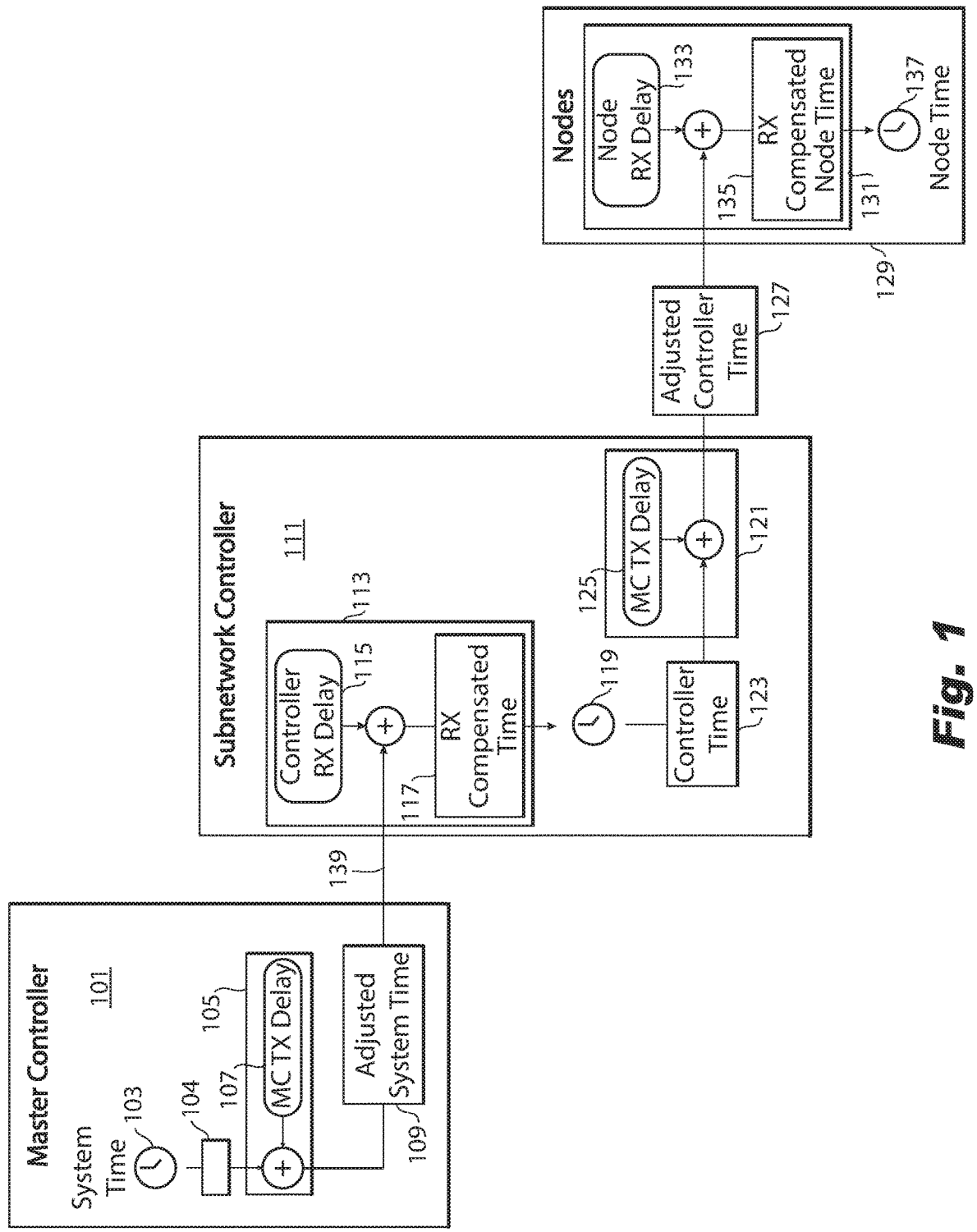
FIG. 1 is a schematic diagram of an embodiment of a distributed network system in accordance with this disclosure.
Figure 2:
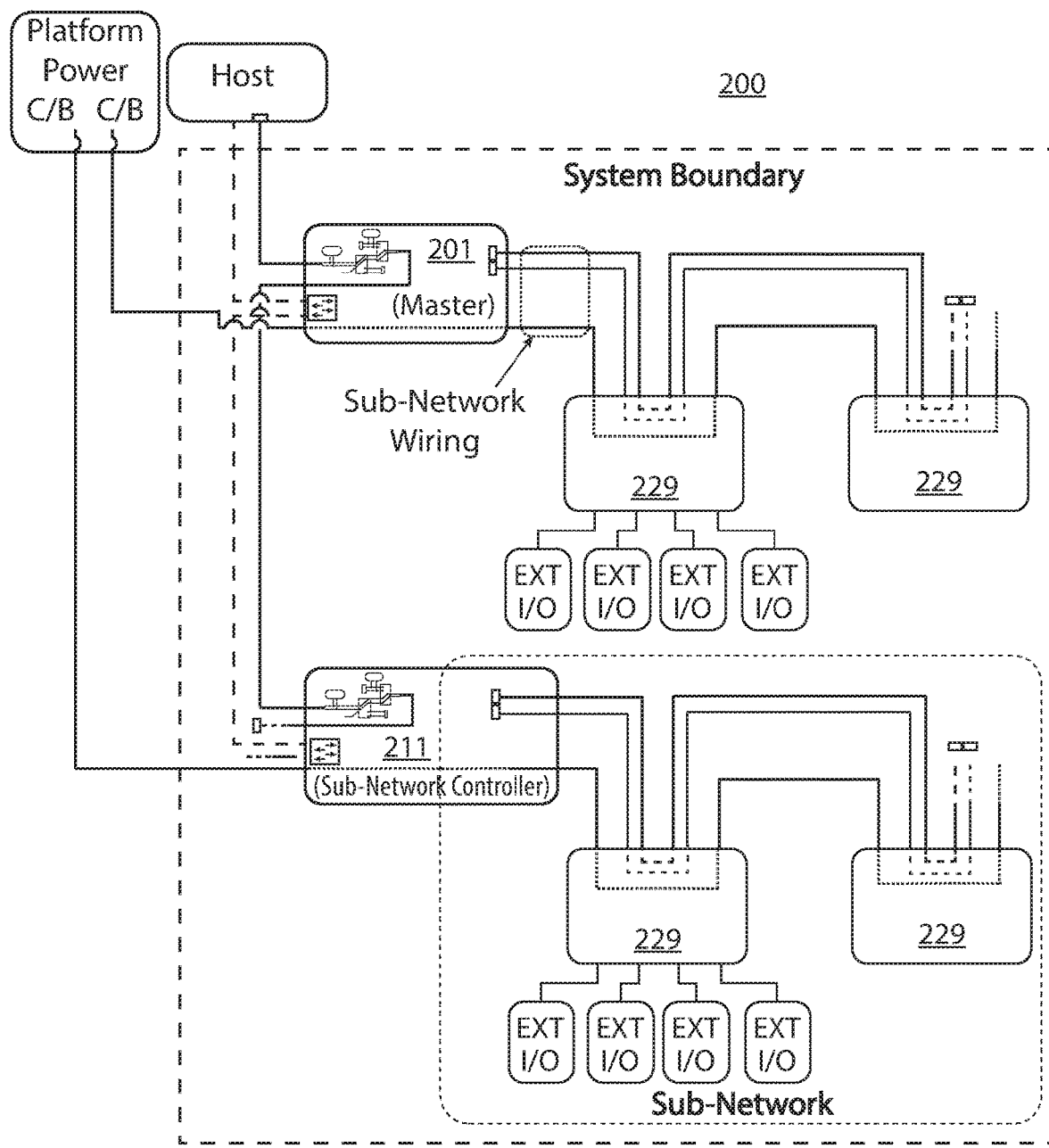
FIG. 2 is a schematic diagram of an embodiment of a distributed network system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2. Certain embodiments described herein can be used to synchronize all clocks in a distributed network (e.g., of sensor nodes and controllers).

A distributed network system 100 can include a master controller 101 having a master clock 103 configured to output a master time 104, and a master transmission delay time module 105 configured to modify the master time to add a known master transmission delay 107 to the master time 104 to output an adjusted master time 109. Each time disclosed herein can be embodied in any suitable data or signal form (e.g., a data message) as appreciated by those having ordinary skill in the art. Any module disclosed herein can include any suitable computer hardware and/or software module(s) as appreciated by those having ordinary skill in the art.

The system 100 can include a first device 111 operatively connected to the master controller 101 and configured to receive the adjusted master time 109 from the master controller 101. The first device 111 can include a first device receive delay time module 113 configured to add a known first device receive delay 115 to the adjusted master time 109 to output a receive delay adjusted first device time 117, and a first device clock 119 configured to receive the receive the delay adjusted first device time 117 to be updated by the receive delay adjusted first device time 117 to synchronize the first device clock 119 with the master clock 103 such that an updated first device clock time is equal or about equal to the master time 104. The first device 111 can include a first device transmission delay module 121 configured to receive the receive delay adjusted first device time 117 and/or the updated first device clock time 123 (which may be the same value) to add a known first device transmission delay 125 to the receive delay adjusted first device time 117 and/or the updated first device clock time 123 to output a transmission delay adjusted first device time 127.

The system 100 can include a second device 129 operatively connected to the first device 111 to receive the transmission delay adjusted first device time 127 from the first device 111. The second device 129 can include a second device receive delay time module 131 configured to add a known second device receive delay 133 to the transmission delay adjusted first device time 127 to output a receive delay adjusted second device time 135. The second device can include a second device clock 137 configured to receive the receive the delay adjusted second device time 135 to be updated by the receive delay adjusted second device time 135 to synchronize the second device clock 137 with the master clock 103 (e.g., and the first device clock 119) such that an updated second device clock time is equal or about equal to the master time 104. In this regards, all clocks can be properly synchronized (e.g., at certain intervals, on start-up of the system, or at any other suitable period of time or event) which can allow for very precise measurement in a distributed data acquisition system, for example.

In certain embodiments, the first device 111 can be a subnetwork controller (e.g., of a distributed sensor system). In certain embodiments, the second device 129 can be a sensor node that uses the second device clock 137 for time stamping measurements. Any other suitable devices for any other suitable purpose is contemplated herein.

A plurality of the second device 129 can be connected to the first device 111, for example. Any suitable number of second devices 129 (of the same or different data acquisition function) are contemplated herein. In certain embodiments, referring additionally to the system 200 of FIG. 2, one or more sensor nodes 229 can be connected directly to the master controller 201. A subnetwork controller 211 (e.g., a subnetwork controller) can be connected to the master controller 201, and one or more sensor nodes 229 can be connected to the subnetwork controller 211. The master controller 201, subnetwork controller 211, and sensor nodes 229 can be the same as or similar to any suitable embodiment of a master controller 101, first device 111, and second device 229, respectively, as disclosed in this disclosure.

As shown in FIG. 2, each device can send out the time message to everything it is directly connected to all at once (e.g., in a broadcast). For example, the master can send the time message to directly connected nodes and the slave (e.g., subnetwork) controller at same time.

Referring again to FIG. 1, in certain embodiments, the master controller 101, the first device 111, and/or the second device 129 can include one or more FPGA's having a deterministic receive delay and/or transmission delay. Each connection 139 between each of the master controller 101, the first device 111, and the second device 129 can include a known connection delay which is included in at least one of a respective transmission delay and/or a respective receive delay. For example, in certain embodiments, each connection 139 can be of a standard which has a deterministic connection delay as a function of the length of the wire. For example, the standard can be RS-485. Any other suitable deterministic hardware and/or software is contemplated herein. The RS-485 communication standard has a known transmit time per wire length, and FPGAs have determinable delays unlike certain software. for example.

In embodiments, when a device receives the signal from a higher up device, it can add a receive delay time to the received time and overwrite its clock. The device can then output a time to lower devices, first adding its own transmit delay. In certain embodiments, intermediate devices can pass the original time through the next device adding receive and transmit delay. In some embodiments, e.g., where a communication line is in use and a transmission has to wait, an intermediate device (e.g., first device 111) can update a clock first, then read its own clock, then add an appropriate receive and/or transmission delay, and then send to next device. Any other suitable order or delineation of operations to any suitable device in any suitable circumstance is contemplated herein.

Embodiments can run an update at fixed intervals (e.g., every 250 microseconds). In certain embodiments, updates could be event based (e.g., to run a time sync when data is required from nodes to ensure node data aligns temporally). Embodiments can combine fixed intervals and event based updates (e.g., a longer interval sync e.g., every 10 min, and event based sync always in operation). Certain embodiments can also adjust a fixed interval for some period of time after an event occurs, e.g., for higher resolution resyncing during sensing for example. Any other suitable timing or event based synching is contemplated herein.

In accordance with at least one aspect of this disclosure, a method can include synchronizing one or more node clocks of one or more data acquisition nodes in a distributed network to a master time of a master clock. Synchronizing can include modifying a master time from a master clock to add one or more transmission and/or receive delays to synchronize the one or more node clocks to the master. In certain embodiments, synchronizing can include first synchronizing a subnetwork controller clock to the master clock, and then synchronizing the one or more node clocks to the subnetwork controller clock.

Synchronizing can include adding all known transmission and receive delays between the master clock and the one or more node clocks to the master time to update the one or more node clocks. Adding all known transmission and receive delays can include adding deterministic FPGA processing delays. In certain embodiments, adding all known transmission and receive delays can include adding known connection delays as a function of length of the connections.

The method can include synchronizing at system start up (e.g., aircraft start up, avionics start up), or based on a sensing event, or at one or more fixed or variable intervals). The method can include any other suitable method(s) and/or portions thereof.

Embodiments allow the propagation of the system time from a master controller (e.g., master time source) to sub-network controllers and the end nodes, for example. Embodiments can apply compensation at each transmission and/or receiver at each node as the system time progresses downward through the network. In certain embodiments, transmit and receive delays can be on the order of about 10 to about 100 nanoseconds.

In embodiments, a time sync message can originate from the master time source, e.g., the master controller, and can be distributed to each sub network and/or connected node. Each sub network controller can relay the time sync message to its connected nodes. At each level, the time sync message can be adjusted to compensate for transmit and receive delays. Taking advantage of the determinism of FPGA based RS-485 communications, each device (e.g., an LRU) can be responsible for adjusting the received time sync message by its own known receive delay. Similarly, if a device is retransmitting the time sync message, it can adjust the message for its own known transmit delay. The sync message can be transmitted at a periodic rate and can have strict timing constraints on propagation delay from time master to node, for example (e.g., to ensure tolerance limits for data acquisition are met).

A side effect of separating devices in network is that each node needs its own time keeping oscillator. But each oscillator is ultimately not perfect and each node can drift off (e.g., even in short period of time, which can be meaningful where synchronization needs to be down to about a microsecond for data to line up temporally). To perform health monitoring functions, tight time synchronization of data acquisition can be required both between recording the starting time stamp of the acquisition and time aligning the sampled values. Conventional systems lack such time synchronization. However, embodiments of this disclosure provide an effective approach to adjusting time across a distributed network. Embodiments can utilize hardware determinism and periodic message exchange instead of relying on alternative methods that require a dedicated hardware clock line or similar signal.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a □circuit,□ □module,□ or □system.□ A □circuit,□ □module,□ or □system□ can include one or more portions of one or more separate physical hardware and/or software components that can together perform the disclosed function of the □circuit,□ □module,□ or □system□ or a □circuit,□ □module,□ or □system□ can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user computer, partly on the user computer, as a stand-alone software package, partly on the user computer and partly on a remote computer or entirely on the remote computer or server. In the latter scenario, the remote computer may be connected to the user computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., □about□, □approximately□, □around□) used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles □a□, □an□, and □the□ as used herein and in the appended claims are used herein to refer to one or to more than one (i.e., to at least one) of the grammatical object of the article unless the context clearly indicates otherwise. By way of example, □an element□ means one element or more than one element.

The phrase □and/or,□ as used herein in the specification and in the claims, should be understood to mean □either or both□ of the elements so conjoined, i.e., elements that are conjunctively present in some cases and disjunctively present in other cases. Multiple elements listed with □and/or□ should be construed in the same fashion, i.e., □one or more□ of the elements so conjoined. Other elements may optionally be present other than the elements specifically identified by the □and/or□ clause, whether related or unrelated to those elements specifically identified. Thus, as a non-limiting example, a reference to □A and/or B□, when used in conjunction with open-ended language such as □comprising□ can refer, in one embodiment, to A only (optionally including elements other than B); in another embodiment, to B only (optionally including elements other than A); in yet another embodiment, to both A and B (optionally including other elements); etc.

As used herein in the specification and in the claims, □or□ should be understood to have the same meaning as □and/or□ as defined above. For example, when separating items in a list, □or□ or □and/or□ shall be interpreted as being inclusive, i.e., the inclusion of at least one, but also including more than one, of a number or list of elements, and, optionally, additional unlisted items. Only terms clearly indicated to the contrary, such as □only one of□ or □exactly one of,□ or, when used in the claims, □consisting of,□ will refer to the inclusion of exactly one element of a number or list of elements. In general, the term □or□ as used herein shall only be interpreted as indicating exclusive alternatives (i.e., □one or the other but not both□) when preceded by terms of exclusivity, such as □either,□ □one of,□ □only one of,□ or □exactly one of.□

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A distributed network system, comprising:
a master controller comprising:
   a master clock configured to output a master time; and
   a master transmission delay time circuit module configured to modify the master time to add a known master transmission delay to the master time to output an adjusted master time,
a first device operatively connected to the master controller and configured to receive the adjusted master time from the master controller,
wherein the first device includes:
   a first device receive delay time circuit module configured to add a known first device receive delay to the adjusted master time to output a receive delay adjusted first device time; and
   a first device clock configured to receive the receive delay adjusted first device time to be updated by the receive delay adjusted first device time to synchronize the first device clock with the master clock such that an updated first device clock time is equal to the master time,
   a first device transmission delay circuit module configured to receive the receive delay adjusted first device time and/or the updated first device clock time to add a known first device transmission delay to the receive delay adjusted first device time and/or the updated first device clock time to output a transmission delay adjusted first device time; and
   a second device operatively connected to the first device to receive the transmission delay adjusted first device time from the first device, wherein the second device includes:
   a second device receive delay time circuit module configured to add a known second device receive delay to the transmission delay adjusted first device time to output a receive delay adjusted second device time; and
   a second device clock configured to receive the receive the delay adjusted second device time to be updated by the receive delay adjusted second device time to synchronize the second device clock with the master clock such that an updated second device clock time is equal to the master time,
wherein the first device is a subnetwork controller, wherein the second device is a sensor node that uses the second device clock for time stamping measurements, wherein the master controller, the first device, and/or the second device include one or more FPGA's having a deterministic receive delay and/or transmission delay, wherein each connection between each of the master controller, the first device, and the second device includes a known connection delay which is included in at least one of a respective transmission delay and/or a respective receive delay, wherein each connection is of a standard which has a deterministic connection delay a function of the length of the wire.

2. The system of claim 1, further comprising a plurality of the second device connected to the first device.

3. The system of claim 1, wherein the standard is RS-485.

4. The system of claim 1, further comprising one or more sensor nodes connected directly to the master controller.

5. A method, comprising:
synchronizing one or more node clocks of one or more data acquisition nodes in a distributed network to a master time of a master clock, wherein synchronizing includes adding all known transmission and receive delays between the master clock and the one or more node clocks to the master time to update the one or more node clocks, wherein adding all known transmission and receive delays includes adding deterministic FPGA processing delays, wherein adding all known transmission and receive delays includes adding known connection delays as a function of length of the connections.

6. The method of claim 5, wherein synchronizing includes modifying a master time from a master clock to add one or more transmission and/or receive delays to synchronize the one or more node clocks to the master.

7. The method of claim 5, wherein synchronizing includes first synchronizing a subnetwork controller clock to the master clock, and then synchronizing the one or more node clocks to the subnetwork controller clock.

8. A distributed network system, comprising:
a master controller comprising:
a master clock configured to output a master time; and
a master transmission delay time circuit module configured to modify the master time to add a known master transmission delay to the master time to output an adjusted master time; and a first device operatively connected to the master controller and configured to receive the adjusted master time from the master controller, wherein the first device includes:
a first device receive delay time circuit module configured to add a known first device receive delay to the adjusted master time to output a receive delay adjusted first device time; and
a first device clock configured to receive the receive the delay adjusted first device time to be updated by the receive delay adjusted first device time to synchronize the first device clock with the master clock such that an updated first device clock time is equal to the master time,
a first device transmission delay circuit module configured to receive the receive delay adjusted first device time and/or the updated first device clock time to add a known first device transmission delay to the receive delay adjusted first device time and/or the updated first device clock time to output a transmission delay adjusted first device time; wherein the first device is a subnetwork controller, wherein the master controller and/or the first device include one or more FPGA's having a deterministic receive delay and/or transmission delay, wherein each connection between each of the master controller and the first device includes a known connection delay which is included in at least one of a respective transmission delay and/or a respective receive delay, wherein each connection is of a standard which has a deterministic connection delay as a function of the length of the wire.

\* \* \* \* \*